United States Patent [19]

Strebel

[11] 4,031,092

[45] June 21, 1977

[54] 1,3-BIS-(CARBOXY-PHENYLAMINO)-s-TRIAZINES

[75] Inventor: Elwood L. Strebel, St. Paul, Minn.

[73] Assignee: Minnesota Mining and Manufacturing Company, St. Paul, Minn.

[22] Filed: June 16, 1975

[21] Appl. No.: 587,240

[52] U.S. Cl. .............................. 260/249.6; 428/426; 427/163

[51] Int. Cl.$^2$ ....................................... C07D 251/70

[58] Field of Search ................................ 260/249.6

[56] References Cited

UNITED STATES PATENTS 3,116,275  12/1963  Gamlen et al. ............. 260/249.8 X
3,867,383  2/1975  Winter ............................ 260/249.6

*Primary Examiner*—John M. Ford
*Attorney, Agent, or Firm*—Cruzan Alexander; Donald M. Sell; Temple Clayton

[57] ABSTRACT

Cyanuric halide is successively reacted with two moles of carboxy substituted aromatic amine and one mole of quaternizing agent such as pyridine and dissolved, e.g., in dilute ammonium hydroxide. At certain concentrations as the solution evaporates, it becomes nematic. The solution is evaporated on an oriented substrate so that the residue is anisotropic and is finally frozen in a resinous form which shows birefringence. The substrate and coating is valuable as a fractional wave plate.

2 Claims, No Drawings

1,3-BIS-(CARBOXY-PHENYLAMINO)-S-TRIAZINES

This invention relates to lyotropic nematic compositions and to sheet materials particularly transparent webs coated with said materials in such a fashion that the webs are birefringent. It further relates to methods for coating transparent webs with said lyotropic nematic materials at substantially uniform thicknesses and to retardant sheet materials produced by said process.

Isotropy is the state of having uniform properties in all directions and anisotropy is the state of having different properties in different directions. It has been found that the surface of glass as well as of many other materials can be made anisotropic by orientation procedures which are collectively termed rubbing. The orientation is evoked not by mere random rubbing but by deliberate unidirectional rubbing using particular pads and materials. Such procedures are set out by Dreyer, U.S. Pat. No. 2,400,877, as well as by H. Zocher and K. Coper in Zeitschrift der physikalischen Chemie, Vol. 132, page 295 et seq.(1928). Thus, it was shown by Zocher et al. that the anisotropy of a rubbed glass surface could be detected by application of thin layers of methylene blue which when viewed with plane polarized light was seen to be oriented so that the coating was dichroic, that is, different colors in different directions. Such results have been found for numerous dyes when aqueous solutions are evaporated, J. F. Dreyer, Journal de physique Vol. 30, page C4-114 to C4-116 (1969).

Particularly if such dichroic films are substantially colorless in one direction they can be used as analyzers for plane polarized light. Further, if absorption is sufficiently strong in the other direction, they can be used to provide polarized light from unpolarized light as has been shown in several patents. Particular use of an oriented substrate is provided by Dreyer, U.S. Pat. No. 2,400,877, herein incorporated by reference for the extensive disclosure of the preparation and use of such substrates and the coating thereof. It is also there described how advantage can be taken of the properties of many dyestuffs to go through a nematic state and how orientation of that state can be preserved by careful evaporation and diffusion of a solution. Further use of dichroic nematic dyestuffs is described in U.S. Pat. Nos. 2,481,830 and 2,544,659.

General, useful papers and comments on liquid crystals are contained in the Discussion held by the Faraday Society on Apr. 24 and 25, 1933, and published in a series of papers in Volume 29 of the transactions of that society, pages 881-1085 (1933). A more recent review is provided by V. A. Usol'tseva and I. G. Chistyakov, (in translation) Russian Chemical Reviews Vol. 32, No. 9, page 495-509 (September, 1963) which includes an extensive bibliography.

For purposes of increasing the contrast of cathode ray tubes and liquid crystal displays, it is advantageous to use a retarder which retards one component of a beam of light with respect to the component at right angles thereto. Such a retarder provides circularly polarized light from plane polarized light. A retarder which results in retardation of one quarter wavelength, $\lambda/4$, is often known as a quarter wave plate. Such plates are used in microscopy to accentuate polarization colors when weakly birefringent materials are examined between crossed Nicol prisms. It is also possible to provide retarders which correspond to more or less than a quarter wavelength.

It was suggested by Dreyer in U.S. Pat. No. 2,400,877 (paragraph bridging pages 2 to 3) that nematic materials which were non-polarizing could be employed in wave or fractional wave plates. However, it does not appear that any of the materials available at that time permitted reducing this concept to practice. Although the term "non-polarizing" does not appear to have been defined, it appears to refer to materials which are insufficiently strongly dichroic to provide substantially complete absorption of one component of light passing through them. This now suggests that retarders could be made from weakly colored or colorless nematic materials. Materials available to Dreyer such as 10-bromophenanthrene-3(or 6)-sulfonic acid become smectic before finally becoming dry and are therefore not applicable.

It is an aim and object of this invention to provide a retarder and compositions for use therein in which orientation is effected by means of an oriented surface such as rubbed glass. Other aims and objects will become evident herein elsewhere.

In accordance with the above and other aims and objects of the invention, a new class of lyotropic mesomorphic, or liquid crystalline, compositions has been found, the members of which can be applied to oriented substrates such as rubbed glass to give anisotropic films which retard one component of a light beam over the other component. The structures of these compounds are not known with certainty and, in fact, several structures may be represented among the compositions of the invention. The compositions are triazine derivatives produced from cyanuric halide, most conveniently the chloride, by successive (1) reaction with two molar proportions of a carboxy-substituted amino-aromatic compound to replace halogens of the cyanuric halide, (2) reaction of the third halogen to form a quaternary group, e.g., reaction with pyridine, and then (3) the compositions are put into solutions, by formation of ammonium salts or salts of other such bases.

The present compositions are 1,3-bis( carboxy aromatic amino) triazine 5-pyridinium base complexes and the ammonium salts thereof which latter are lyotropic mesomorphs which means that they exhibit mesomorphic properties when solvated or dissolved within certain limits. Such behavior is observed with some soaps of fatty acids. The preferred materials are lyotropic nematic mesomorphs which is that as mesomorphs they display the properties of nematic phases rather than smectic or cholesteric phases. The surprising feature of these compounds is that, when the mesomorphic solutions oriented by the substrate are dried so as to avoid ebullition or other disturbance, the residual film is anisotropic although no longer mesomorphic. Furthermore, because of the peculiarities of the present compositions, the film is negatively birefringent so that retardation of substantially the same extent is observed as the sheet is inclined along the axis of orientation of the substrate. The residue may also be described as vitreous or resinous. It is relatively resistant to wiping with a dry cloth and can be heated moderately with only slight if any loss in anisotropy. It is rather resinous or varnish-like and may be said to have a frozen anisotropy or memory of orientation. By normal illumination, the film is unnoticeable and substantially colorless. It may be sufficiently thin that it will exhibit interference colors. Slight residual color of the film may usually be discharged when the film is heated above about 150°–200° C. without greatly changing the birefringence or anisotropy.

The preferred compositions of the invention are obtained by reacting cyanuric chloride with two moles of amino-benzoic acid, more preferably para-aminobenzoic acid, followed by reaction with one mole of pyridine base and solution in about 10–15% aqueous ammonium hydroxide to a concentration of about 35–60 g/l. This solution is applied to a rubbed oriented surface in an amount of about 1 cc per 35–45 cm² of surface and evaporated to give a coating about 0.44 μ thickness. It is convenient to apply the requisite amount of solution to the upper edge of a vertically disposed oriented substrate and permit it to be distributed by gravity. Operative under conditions which minimize evaporation during spreading of the solution assist in providing uniformity of the coating. The coated substrate is then removed to conditions which assure evporation of solvent without disturbance. The residue is found to be an oriented birefringent film.

Films of about 0.40 to 0.65 μ thickness provide retardations of from about 65° to 120°. Films of greater thickness may have some tendency to be less oriented as the distance from the oriented surface of the substrate increases and it generally is preferred to have coatings of from about 0.1 to 5 μ in thickness.

Other carboxyl-substituted aromatic amines which can be employed and give birefringent films from dilute ammonium hydroxide solution include, but are not limited to:

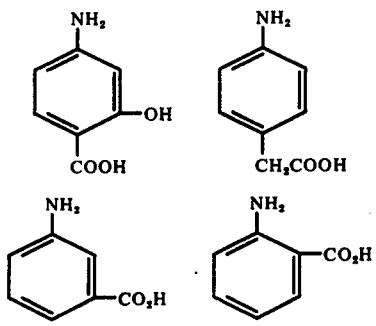

In some instances, the pyridine can be replaced by other pyridine bases such as 3 or 4-methylpyridine. Other chlorinated heterocyclic compounds are not contemplated.

The best mode of practicing the invention is illustrated by the following examples in which parts of solids are by weight and temperatures are in ° C.

EXAMPLE 1

Reaction of cyanuric chloride and p-aminobenzoic acid.

A slurry is prepared from 246.6 g (1.8 mole) p-aminobenzoic acid in 1 liter water, and solutions of 95.4 (0.9 mole) anhydrous sodium carbonate in 690 ml. water and 110.7 g (0.6 mole) cyanuric chloride in 460 ml. acetone.

A 4000 ml. breaker is placed in a large metallic container on a high wattage hot plate. To the beaker is added 1000 ml. of water and to the container is added sufficient ice to reach a level equal to that of the water in the beaker. The contents of the beaker are stirred vigorously and the slurry of p-aminobenzoic acid is added. When the temperature of the suspension has dropped to 5°–10° C., the acetone solution of cyanuric chloride and 460 ml. of the sodium carbonate solution are added simultaneously from two graduated 500 ml. addition funnels over a period of 50–60 minutes. The flow of the sodium carbonate solution is started after approximately 25 ml. of acetone solution has been added and further addition is regulated to prevent the pH of the suspension from exceeding 7. Following the completion of the addition of the solutions, the ice water is siphoned out and replaced with warm water and the hot plate is turned on. The suspension is heated with stirring to approximately 85°–90° C. over about 2 hours thereby expelling acetone. During the warming process, the remaining 230 ml. of sodium carbonate is added in 25 ml. aliquots periodically, at such a rate that the pH does not exceed about 7.0 Supplementary stirring may be required. The suspension gradually becomes extremely thick and it is heated for 45 minutes following the addition of the last aliquot of sodium carbonate solution. One liter of boiling water is stirred into the suspension and the hot suspension is filtered by suction. The filter cake is collected, broken up, and resuspended in two liters of boiling water and filtered by suction as before. The filter cake is again broken up and suspended in 3 liters of boiling acetone as 4 to 5 portions using 600 to 700 ml. of boiling acetone each time. The product is collected from the hot acetone suspension by suction filtration and air dried to constant weight at 110°–120° C. The yield is 218 g. Mass spectral data are in agreement with the structure for 1,3-bis(carboxyphenylamino)-5-chlorotriazine:

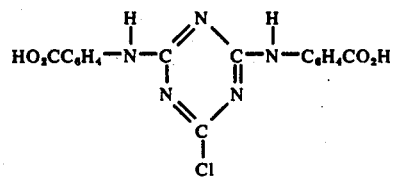

This material should be free from p-aminobenzoic acid. A thin layer chromatogram (TLC) on Eastman Chromatogram Sheet 13254 — cellulose with fluorescent indicator can be used to detect p-aminobenzoic acid. A sample is dissolved in water by adding 10% alkali metal hydroxide dropwise until solution is complete and this solution is spotted on the TLC plate beside known p-aminobenzoic acid (spotted from acetone solution). The chromatogram is eluted with 4:1 methanol — concentrated ammonium hydroxide solution. If p-aminobenzoic acid is found to be present, it is removed by another wash with boiling acetone.

EXAMPLE 2

In a 800 ml. beaker in a hot water bath heated by a hot plate and equipped with a mechanical stirrer is placed 450 ml. of anhydrous pyridine. When the temperature of the pyridine reaches 70° C., 150 g. of the product of Example 1 is added with stirring. The temperature is increased to 85° over 1 hour while the suspension is stirred vigorously. After 1 hour, the solid is collected by suction filtration. The beaker is rinsed with ice cold pyridine and washings are added to the filter cake. The filter cake is further washed with ice cold pyridine so that a total of about 150 ml. is used in all. The filter cake is sucked as dry as possible, then broken up in a large tray and air dried at room temperature for 20 hours. The yield is about 200 to 210 g. of pyridinium comples which is believed on the basis of nuclear magnetic resonance spectra and other data to be 1,3-bis(p-carboxyphenylamino)triazine-5-pyridinium chloride and to have the structure:

the quaternization step. The recurring units as indicated by mass spectral data are believed to be:

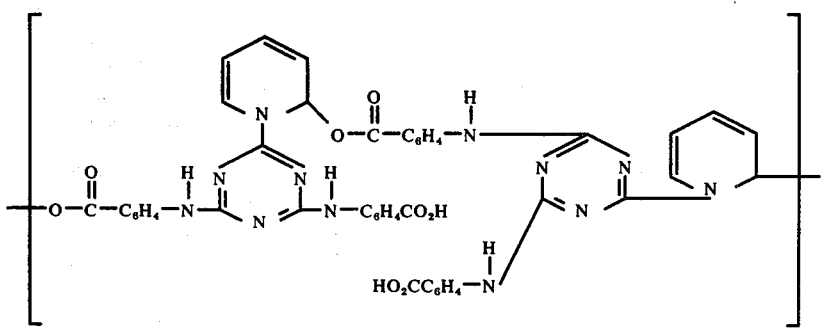

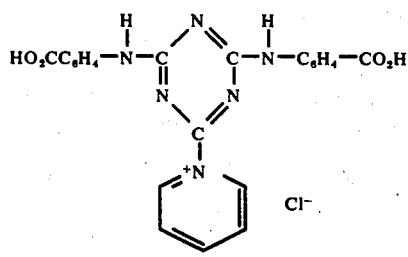

EXAMPLE 3

The crude material is somewhat purified by solution and reprecipitation, i.e., by fractional precipitation. It is apparently simultaneously converted to the quaternary hydroxide or an hydroxylated pyridyl compound.

To a suspension of 20 g. of the crude solid of Example 2 in 500 ml. of water are added 7.0 ml. of concentrated ammonium hydroxide with stirring. After stirring for 10 minutes, any undissolved material is separated by suction filtration and discarded.

The solution is placed in a beaker equipped for vigorous stirring and with the electrodes of a pH meter just below the surface of the solution. The pH of the stirred solution is followed as a 10% hydrochloric acid solution is added slowly. When the pH has stabilized at 7.5–8.0, the mixture is stirred for 10–15 minutes. The large liquid crystalline globules which form gradually break up releasing acid and there is a tendency for the pH to drift to below 7. More hydrochloric acid is added slowly in approximately 0.5 to 2 ml. aliquots until pH 6 is reached. Rapid stirring is continued for 5 minutes. If the pH remains at 6 and there appear to be no more large globules, the deeply colored precipitate is collected by suction filtration. If there are still globules larger than 3 mm. in diameter, stirring is continued for about 15 minutes before filtration.

The suspension is filtered using hardened filter paper and 18.5 cm. or larger Buchner funnels. The filter paper tends to become clogged and may have to be changed frequently. A spatula is used to scrape the dark red material off the filter paper. This is referred to as polymeric additive and is dried and used below. It appears to be of a polymeric nature and to be formed particularly in the substantial absence of water during the quaternization step.

The filtrate above should be orange. If it is still dark red, the above procedure is repeated. The pH is again monitored with a pH meter and 10% hydrochloric acid added slowly. When the pH stabilizes around 5.7 after stirring for 5 minutes, any fine orange precipitate is collected as above. The filtrate should be deep yellow to slightly orange and the pH should not be above 5.7 or 5.8.

The yellow to slightly orange solution is further acidified gradually and a bright yellow precipitate forms. Precipitation is essentially complete at pH 5.1. It is advisable to stir for a few minutes to be sure the pH does not begin to rise. The yellow pyridinium compound, which is solid, is collected by suction filtration. It is not as gelatinous as the previous materials and filtration is more rapid.

The filtrate should be colorless. If it is still yellow, the acidification step is repeated.

The yellow filter cake is sucked as dry as possible, removed and broken up and suspended in acetone. The acetone suspension is filtered, the yellow filter cake is broken up and air dried. The structure is believed to be either of the following pyridinium complexes:

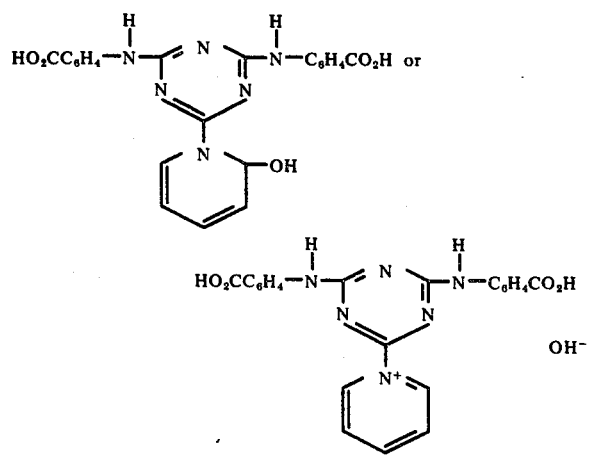

or possibly a mixture on the basis of nuclear magnetic resonance spectroscopy and absence of chlorides in sodium fusion. It will be evident that an internal salt is also possible.

EXAMPLE 4

The procedure of quaternization Example 2 is repeated using product of Example 1 containing about 5–10% water (or adding 5–10% of water to dry product) and a crude pyridinium complex is obtained which is not fractionally precipitated but is used directly (42 g) to make a dilute solution in 1000 ml. water and 14.3 ml. concentrated (18%) ammonium hydroxide. The suspension is stirred for 5 to 10 minutes, filtered to remove any undissolved material and to it is added a small amount (2.3 ml. of 10% solution) of an aqueous solution of a nonionic surfactant such as the propylene oxidepropylene glycol polyol of molecular weight 8700 available commerically as Pluronic F-68. The solution thus contains about 0.02% of added surfactant which constitutes about 0.5% of solutes. This solution of lyotropic nematic composition is used as described in Example 6 below for coating oriented substrates. It will be apparent that the presence of chloride ion which is not here removed will be immaterial in the coating solution as the same cation may be present as shown by the pyridinium hydroxide of Example 3.

EXAMPLE 5

The products obtained above in Example 3 by fractional precipitation are recombined in proportions of about 40 parts of the purified light yellow pyridinium complex and 2 parts of the polymeric additive first precipitated. The coating solution is prepared as described above in 1000 ml. water. The solution contains 0.2% polymeric additive constituting 5% of solutes. This appears to be an illustration of the enhancement of nematic behavior by impurities noted in U.S. Pat. No. 2,400,877. The color is not sufficient to make the residual nematic layer appear dichroic. This solution is also applied as described below in Example 6. Other materials which are used in place of the above polymeric additive include glycerine, 2-amino-ethanol and ammonium salts of 10-undecenoic acid, oleic acid or lauric acid. These are used in about the same amounts, i.e. about 0.5 to 10% the amount of lyotropic mesomorph, and the resulting solutions are also applied as below to give birefringent sheet materials.

EXAMPLE 6

Any method for activating or orienting the surface may be employed provide only that it is so applied that anisotropy is achieved. The following procedure is found to be fully satisfactory. Further description is to be found in U.S. Pat. No. 2,400,877.

The rubbing composition is prepared by mixing thoroughly 250 ml. of water with about 290 (± 10 g.) of 0.62 $\mu$ average diameter zirconium oxide such as TAM Zirox B available from Tam Division of National Lead Industries and about 37 (± 2 g.) of technical grade calcium carbonate. To the thoroughly mixed thin paste is added 1.25 ml. of dibutylamine phosphate (available as Monsanto D. P. solution) which causes a slight effervescence.

The surface of the substrate to be rubbed or activated must be thoroughly clean and free from dirt, grease, etc. Glass substrates are washed with a detergent solution and rinsed.

A rubbing tool is used which is conveniently a straight wooden stick about 5 cm. square and at least as long as the width of the substrate. It is usually wrapped with polyurethane foam to a thickness of about 5 to 10 mm. but other such materials can be used.

The substrate surface is oriented by first applying the rubbing composition to both the surface and the rubbing tool and then stroking the substrate about 10 times in one direction. The rubbing tool is rinsed and two fresh surfaces of the tool are then used to stroke the surface, once with each surface of the tool. The substrate is rinsed with water to remove all traces of rubbing compound but taking care not to touch or otherwise disturb the oriented surface. The back of the substrate may be sponged off.

The oriented surface and the reverse of the substrate are rinsed with distilled or deionized water and the coating composition of the invention is applied by flowing from a liquid dispenser to a thickness of about 1 ml. per 40 to 50 cm$^2$ on the oriented substrate and dried. During the drying of the solution, as the solute becomes more concentrated, the residue shows nematic properties which are oriented by the substrate. The dried film retains the anisotropy of the nematic phase although it itself is not mesomorphic but may be described as an anisotropic vitreous or resinous coating. Retardation of about 90° is determined for the film which is about 0.45 $\mu$ thick.

EXAMPLE 7

Similar birefringent films are formed using 4-propyl pyridine or 3 or 4-picoline instead of pyridine for quaternization and others by using ortho- or meta-aminobenzoic acid instead of p-aminobenzoic acid and applying solutions of the quaternized carboxyphenylamino triazines to oriented glass substrates. These films are found to give retardation of about 90°.

What is claimed is:

1. As a composition of matter substantially chlorine free 1,3-bis(carboxyphenylamino)triazine 5-pyridinium complex forming lyotropic nematic phase in concentrated solution in aqueous ammonium hydroxide and having nuclear magnetic resonance spectra consistent with the structures:

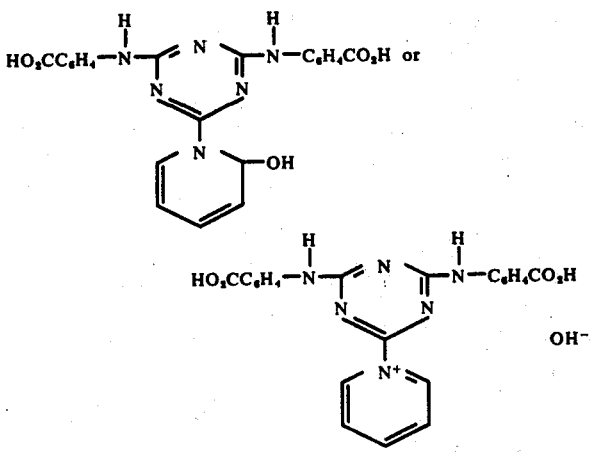

2. 1,3-Bis(carboxyphenylamino)triazine-5-pyridinium complex represented by the formula:

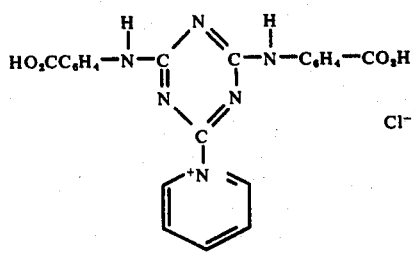

* * * * *